(12) United States Patent
Arai et al.

(10) Patent No.: US 7,684,577 B2
(45) Date of Patent: Mar. 23, 2010

(54) VEHICLE-MOUNTED STEREOPHONIC SOUND FIELD REPRODUCER

(75) Inventors: Daisuke Arai, Tokyo (JP); Fujio Hayakawa, Tokyo (JP); Toyoaki Kitano, Tokyo (JP); Yutaka Kotani, Tokyo (JP); Yutaka Yamagishi, Tokyo (JP); Masahiro Ieda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 801 days.

(21) Appl. No.: 10/312,883

(22) PCT Filed: May 28, 2001

(86) PCT No.: PCT/JP01/04462

§ 371 (c)(1),
(2), (4) Date: Jan. 2, 2003

(87) PCT Pub. No.: WO02/098170

PCT Pub. Date: Dec. 5, 2002

(65) Prior Publication Data

US 2003/0142842 A1    Jul. 31, 2003

(51) Int. Cl.
*H04R 5/02* (2006.01)
(52) U.S. Cl. .................................. 381/302; 381/86
(58) Field of Classification Search ................ 381/302, 381/86, 87, 333, 385–390, 300; 362/413
See application file for complete search history.

(56) References Cited

U.S. PATENT DOCUMENTS

| | | | | |
|---|---|---|---|---|
| 3,870,834 A | * | 3/1975 | Yeaple | 381/301 |
| 4,061,877 A | * | 12/1977 | Phillips | 381/301 |
| 4,075,438 A | * | 2/1978 | Kappel | 381/301 |
| 4,205,878 A | * | 6/1980 | Wooten | 297/391 |
| 4,440,443 A | * | 4/1984 | Nordskog | 297/397 |
| 4,490,842 A | * | 12/1984 | Watanabe | 381/86 |
| 4,492,422 A | | 1/1985 | Bieschke | |
| 4,597,470 A | * | 7/1986 | Takagi et al. | 181/141 |
| 4,696,370 A | * | 9/1987 | Tokumo et al. | 181/141 |
| 4,731,848 A | * | 3/1988 | Kendall et al. | 381/63 |
| 4,758,047 A | | 7/1988 | Hennington | |
| 5,282,251 A | * | 1/1994 | Petersen | 381/333 |
| 5,754,664 A | * | 5/1998 | Clark et al. | 381/86 |
| 5,854,847 A | * | 12/1998 | Yoshida et al. | 381/302 |
| 5,887,071 A | * | 3/1999 | House | 381/386 |

(Continued)

FOREIGN PATENT DOCUMENTS

DE    4419079 C1    11/1995

(Continued)

*Primary Examiner*—Vivian Chin
*Assistant Examiner*—Jason R Kurr
(74) *Attorney, Agent, or Firm*—Birch, Stewart, Kolasch & Birch, LLP

(57) ABSTRACT

In correspondence with the left and right external ears of a listener occupying a seat, a three dimensional sound field reproducing unit includes at least more than two speakers disposed on a headrest on the top of a backrest of the seat, and three dimensional signal processing means which converts an output signal from a sound source into a three dimensional sound field signal for supplying it to each of the speakers. Three dimensional sound field with high accuracy and fidelity is reproduced near the external ears of the listener.

3 Claims, 18 Drawing Sheets

U.S. PATENT DOCUMENTS

| | | | | |
|---|---|---|---|---|
| 5,997,091 A | * | 12/1999 | Rech et al. | 297/391 |
| 6,272,360 B1 | * | 8/2001 | Yamaguchi et al. | 455/569.2 |
| 6,375,135 B1 | * | 4/2002 | Eason et al. | 248/166 |
| 6,614,910 B1 | * | 9/2003 | Clemow et al. | 381/1 |
| 6,731,765 B1 | * | 5/2004 | Sotome | 381/160 |
| 6,744,898 B1 | * | 6/2004 | Hirano | 381/333 |
| 6,961,433 B2 | * | 11/2005 | Ishii | 381/17 |
| 7,050,593 B1 | * | 5/2006 | Emerling et al. | 381/86 |
| 2001/0021257 A1 | * | 9/2001 | Ishii | 381/17 |
| 2003/0086572 A1 | * | 5/2003 | Sotome et al. | 381/17 |

FOREIGN PATENT DOCUMENTS

| | | |
|---|---|---|
| GB | 2224178 A | 4/1990 |
| JP | 57-137340 U | 3/1984 |
| JP | 59-171477 A | 9/1984 |
| JP | 61-57863 U | 4/1986 |
| JP | 62-121897 U | 8/1987 |
| JP | 63-166953 U | 12/1988 |
| JP | 5-37994 A | 2/1993 |
| JP | 05-344584 | 12/1993 |
| JP | 6161466 | 6/1994 |
| JP | 07-227332 | 8/1995 |
| JP | 7-255099 A | 10/1995 |
| JP | 07-281675 | 10/1995 |

* cited by examiner

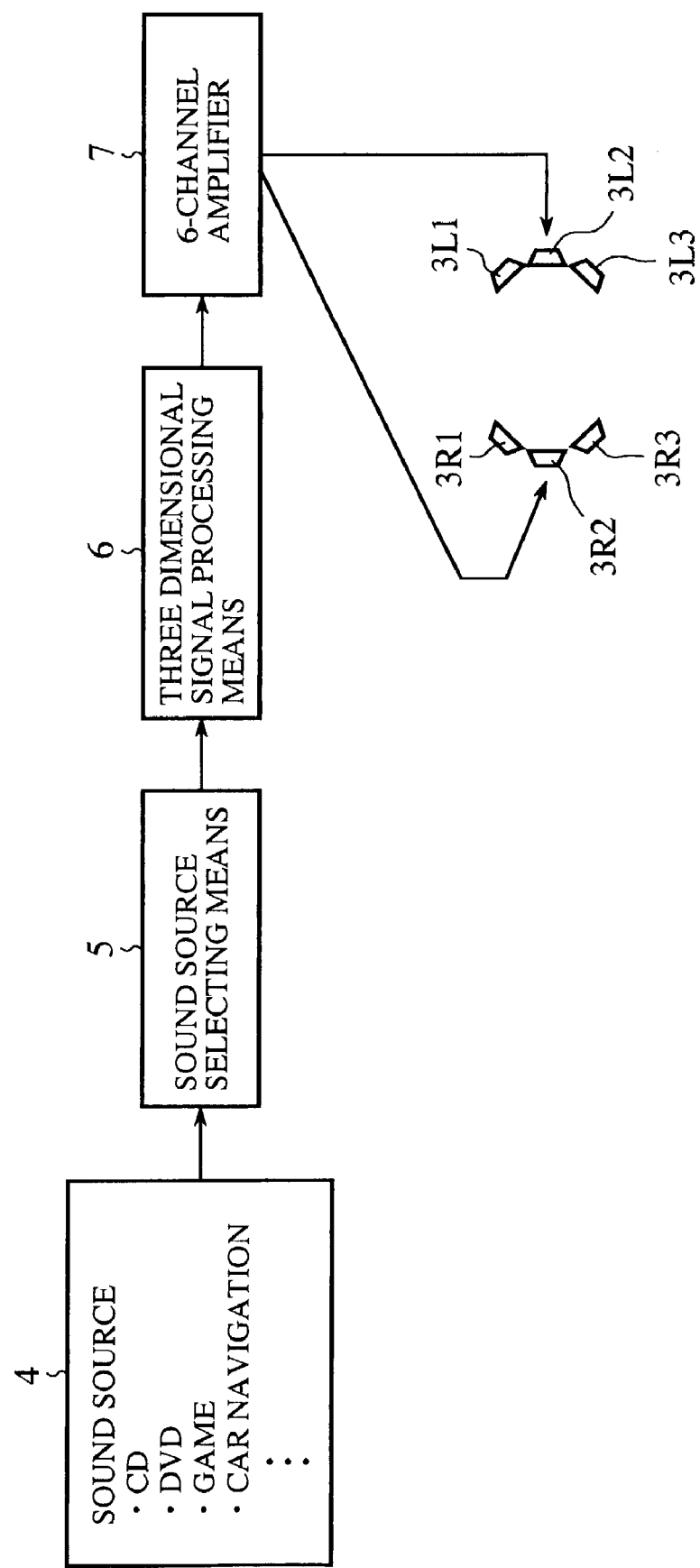

FIG.6
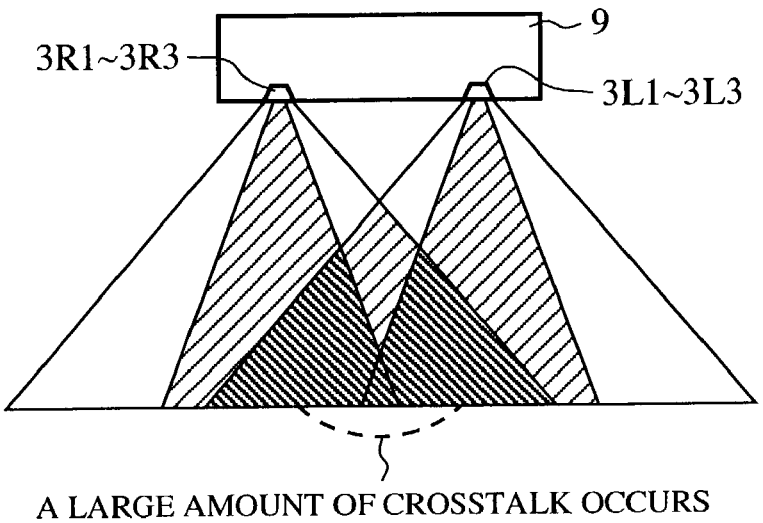
A LARGE AMOUNT OF CROSSTALK OCCURS
FIG.7
(a)
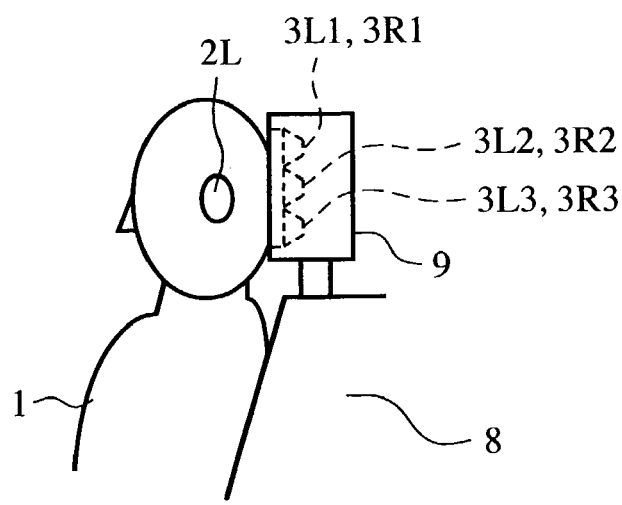
(b)
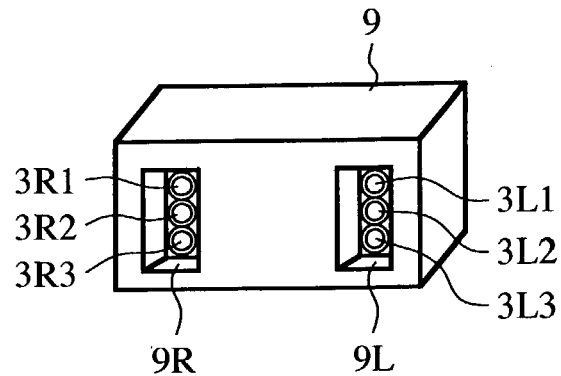

CROSSTALK EXISTS BUT A LITTLE

VEHICLE-MOUNTED STEREOPHONIC SOUND FIELD REPRODUCER

TECHNICAL FIELD

This invention relates to a vehicle-mounted three dimensional sound field reproducing unit capable of making a listener enjoyed perceiving a three dimensional sound field with rich presence by disposing speakers in a position close to a head of the listener inside a vehicle compartment and by controlling the sound fields near external ears of the listener.

BACKGROUND ART

Conventionally, many systems have been proposed in which a listener enjoys listening to a stereophonic sound field by wearing a headphone. These systems are mainly based on the principle that the sound arrived at eardrums is controlled to reproduce the original sound field. However, since the distance from the external ears to the eardrums are largely different every individual, the sound field to be localized in the front may sometimes shift to the rear, which dulls the sense of distance.

In addition, there have been devised techniques in which, by utilizing speakers in a room or inside a vehicle compartment, the arriving time of the sound waves from the speakers to a listener is made even to control the position of the image, or in which a transfer characteristic is convoluted into the input signal to be inputted to the speakers to control the sound field. However, these techniques have shortcomings that they are valid only within a small listening area and are for instance effective only for one listener who sits on a target seat inside the vehicle compartment (hereinafter also referred to as the seat). Still further, these techniques exert a different effect that largely varies depending on a situation where other listeners are seated inside the vehicle and a situation where nobody is.

This invention has been made to solve the above-described and other problems, and has an object of providing a vehicle-mounted three dimensional sound field reproducing unit which enables reproduction of a) a sound field with high accuracy and fidelity near the external ears of the listener without wearing a headphone, and b) a sound field with high accuracy and fidelity as compared with the conventional headphone having one speaker per one ear, as a result of adoption of at least two or more speakers (i.e., four or more speakers for both the ears).

DISCLOSURE OF INVENTION

A vehicle-mounted three dimensional sound field reproducing unit according to this invention includes at least two speakers provided near a headrest which is on the top of a backrest of a seat in correspondence with left and right external ears of a listener occupying the seat so as to reproduce sound fields near the external ears; and three dimensional signal processing means for converting an output signal from a sound source into a three dimensional sound field signal for supplying it to each of the speakers.

According to this invention, it is possible to position the head of the listener between the left and right speakers, and the distance to the sound fields near the external ears as the target for control can be made small. As a result, this makes the listener enjoyed listening to the three dimensional sound field and reduces crosstalk between the left and right speakers.

In the vehicle-mounted three dimensional sound field reproducing unit according to this invention a pair of left and right recessed portions are formed in a front of the headrest so as to dispose the speakers sequestered from a surface of each of the recessed portions.

According to this invention, it surely reduces crosstalk between the left and right speakers.

In the vehicle-mounted three dimensional sound field reproducing unit according to this invention a pair of left and right recessed portions are provided in a front of the headrest, a box is provided inside each of the recessed portions so as to sandwich a head of the listener, and the speakers are provided in the box in correspondence with the left and right external ears of the listener.

According to this invention, it is possible to dispose the speakers in a position close to the external ears of the listener, which yields a state akin to that where an ideal headphone is worn by the listener.

The vehicle-mounted three dimensional sound field reproducing unit according to this invention includes at least two speakers provided on a ceiling so as to surround a head of a listener occupying a seat in correspondence with left and right external ears of the listener; and three dimensional signal processing means for converting an output signal from a sound source into a three dimensional sound field signal for supplying it to each of the speakers.

According to this invention, the distance between the speakers and the head of the listener becomes short, so that it is possible to reproduce a three dimensional sound field with high accuracy and fidelity near the external ears of the listener and to give a freedom in the disposition of the speakers.

The vehicle-mounted three dimensional sound field reproducing unit according to this invention further includes a partition plate, provided between the at least two speakers respectively provided in correspondence with the left and right external ears, for preventing crosstalk.

According to this arrangement, it ensures reduction in crosstalk.

In the vehicle-mounted three dimensional sound field reproducing unit according to this invention the at least two speakers respectively provided in correspondence with the left and right external ears are disposed close to a partition plate, and a direction of radiated sounds is respectively directed to the external ears.

According to this arrangement, in ensures reduction in crosstalk.

In the vehicle-mounted three dimensional sound field reproducing unit according to this invention the at least two speakers respectively provided in correspondence with the left and right external ears and a partition plate provided between the speakers are integrally assembled into a board, and the board is provided so as to be movable back and forth and left and right relative to a ceiling.

According to this invention, even if the head of the listener occupying the seat is moved by the back and forth movement of the seat, it gives a guarantee disposition of the speakers and the partition plate to most appropriate positions.

The vehicle-mounted three dimensional sound field reproducing unit according to this invention includes at least two speakers respectively provided in a box provided on each end of a first pole which is slidable left and right so as to sandwich a head of a listener occupying a seat; a second pole which has mounted on one end thereof the first pole and is slidable back and forth; and a vertically slidable third pole which is tiltably supported on a supporting part, and a tip of which is coupled to an opposite end of the second pole.

According to this invention, even if the back and forth movement of the seat occurs, it appropriately maintains the positional relationship between the speaker-mounting parts and the head of the listener.

The three dimensional sound field reproducing unit according to this invention further includes a partition plate, retractably provided on the first pole between the left and right speakers, for reducing crosstalk.

According to this invention, by withdrawing the partition plate backward when not in use, the partition plate does not interfere, thereby reducing crosstalk.

In the vehicle-mounted three dimensional sound field reproducing unit according to this invention the supporting part is fixed to a roof on a rear seat.

According to this invention, it enables a fine adjustment of the positional relationship between the speaker-mounting parts and the head.

The vehicle-mounted three dimensional sound field reproducing unit includes at least two speakers respectively provided in a center pillar and in a side of an adjacent seat inside a vehicle compartment so as to sandwich a head of a listener occupying the seat.

According to this invention, since a large space is secured for mounting the speakers, the region of reproduction can be widened so as to reproduce bass.

In the vehicle-mounted three dimensional sound field reproducing unit according to this invention the three dimensional signal processing means includes left and right crosstalk cancellers; and a head transfer function part and an inverse transfer characteristic part respectively provided on an input side of each of the left and right crosstalk cancellers.

According to this invention, it allows efficient and sure reduction in crosstalk.

In the vehicle-mounted three dimensional sound field reproducing unit according to this invention the three dimensional signal processing means includes a time delay part provided on each of the input sides of the left and right crosstalk cancellers.

According to this invention, even if the head transfer function and the crosstalk canceling component vary due to the positional deviation of the head of the listener and the speakers, time delay can be corrected.

The vehicle-mounted three dimensional sound field reproducing unit according to this invention includes a seated position memory which stores therein a seated position of the listener; a seated position control part for reading out the seated position from the seated position memory interlocked with an adjustment of the seated position; and a convolution coefficient control part for reading out a convolution coefficient based on the seated position supplied from the seated position control part for supplying it to the three dimensional signal processing means.

According to this invention, it appropriately cancels crosstalk irrespective of the change in the seated position.

The vehicle-mounted three dimensional sound field reproducing unit according to this invention includes a convolution coefficient memory which stores therein, as an inverse transfer coefficient, an inverse transfer function measured in advance; a transfer characteristic measuring part for reading out a convolution coefficient from the convolution coefficient memory depending on the measured transfer characteristic; and a convolution coefficient control part for supplying the convolution coefficient supplied from the transfer characteristic measuring part to the three dimensional signal processing part.

According to this invention, it appropriately cancels crosstalk irrespective of the change in the seated position.

BRIEF DESCRIPTION OF DRAWINGS

FIG. 2 is a block diagram of a reproducing circuit for supplying a reproducing signal to the speakers with an output signal from a sound source as a three dimensional sound field signal.

FIG. 6 is a distribution diagram of sounds radiated from the speakers.

FIGS. 7($a$) and 7($b$) are diagrams showing the arrangement of another speakers relative to the headrest, wherein FIG. 7($a$) is a side view and FIG. 7($b$) is a perspective view.

BEST MODE FOR CARRYING OUT THE INVENTION

In order to explain this invention in more detail, a description will now be made about the best mode for carrying out this invention with reference to the accompanying drawings.

First Embodiment

Figure 1:
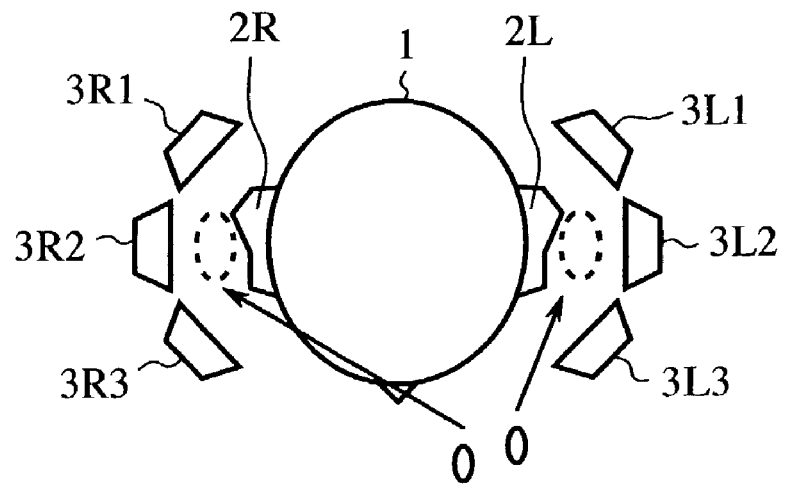
FIG. 1 is a schematic diagram showing the state of arrangement of speakers to reproduce the three dimensional sound field.

FIG. 1 is a schematic diagram showing an arrangement of speakers in a three dimensional sound field reproducing unit. Three speakers 3L1, 3L2, 3L3 and 3R1, 3R2, 3R3 are respectively disposed near each of the ears 2L, 2R of a listener 1. By means of signals to be supplied to each of the speakers, the sound fields 0 near the external ears are controlled.

FIG. 2 shows a reproducing circuit for supplying a reproducing signal to each of the speakers 3L1, 3L2, 3L3 and 3R1, 3R2, 3R3. Referring to FIG. 2, reference numeral 4 denotes various kinds of sound source, reference numeral 5 sound source selecting means for switching the output of the sound source 4, reference numeral 6 three dimensional signal processing means, and reference numeral 7 a 6-channel (6ch) amplifier for outputting reproducing signals to six speakers 3L1, 3L2, 3L3 and 3R1, 3R2, 3R3.

The sound source 4 includes a 2-channel compact disc (CD), a 5.1-channel digital versatile disk (DVD), an amplitude modulation (AM) and frequency modulation (FM) sound source, a sound source with a three dimensional effect for playing games, a voice guidance for car navigation, or the like.

The three dimensional signal processing means 6 includes a digital input part (not shown), an analog input part (not shown), an analog/digital (A/D) converting part (not shown), a digital signal processing part (not shown), a digital/analog (D/A) converting part (not shown), or the like, and performs signal processing for converting an output signal from the sound source selecting means 5 into a three dimensional sound field signal.

In the first embodiment, there is shown a case in which three speakers 3L1, 3L2, 3L3 and 3R1, 3R2, 3R3 are respectively disposed for each of the left external ear and the right external ear. The reason why this kind of arrangement is preferable is given hereinbelow. In this case the control points (points to reproduce in the space the state of target sound wave) lie in three points near the respective external ears.

(1) First Reason

It is possible to produce in the control points the same sound pressure as in the case of the original sound field. In order to realize it, a transfer function (an impulse response as represented by a time domain) is required from the speakers 3L1, 3L2, 3L3 and 3R1, 3R2, 3R3 to the control points.

The shorter the time of this transfer function becomes, the smaller the scale of the hardware to perform the signal processing becomes. Therefore, the arrangement of the speakers should be selected so as to shorten the time as far as possible. In an ordinary room or in a vehicle compartment, it might be said that the shorter the distance between the speakers and the control points is, the shorter the time of the transfer function is.

It is because that the more the speakers and the control points away from each other, the larger the ratio of reflected sounds arrived at the control points from all directions of the room or the vehicle compartment becomes compared with the direct sounds arrived directly from the speakers to the control points. Conversely, in case the distance between the speakers and the control points is small, there will increase the ratio of the direct sounds arrived directly from the speakers to the control points compared with the reflected sounds inside the room. The amplitudes of the transfer function will thus be dominated for the most part by the direct sounds, and the amplitude components of the reflected sounds are extremely small as compared with the direct sounds. Therefore, the time of the transfer function can be regarded as the time required for converging the direct sounds.

(2) Second Reason

By making the speakers disposed on the left and right of the head 1 of the listener close to the neighborhood of the external ears, the ratio of crosstalk between both the ears can be reduced. The closer the right speakers are brought to the right ear, the larger the ratio between the sounds becomes, one of which directly comes into the right ear and the other of which leaks to the opposite left ear, thereby decreasing crosstalk.

If the amount of the left and right crosstalk is small, it becomes possible to independently perform the signal processing of the left and right sound fields when the sound fields 0 near the external ears are controlled. The greatest advantage thereof is in that the amount of computation is alleviated down to ½. The signal processing to be performed in the three dimensional sound field reproducing unit is proportional to the product of the number of the speakers and that of the control points.

Now, suppose that the number of the speakers is respectively N in the left and the right and that the number of the control points is also respectively N in the left and the right. In case the amount of crosstalk is small and the left and right signal processing can be independently performed, the amount of computation is N×N per one ear and 2×(N×N) for left and right ears. In case the amount of crosstalk is large, on the other hand, since it becomes necessary to process the left and right signals together, the amount of computation becomes 2N×2N, i.e., 4×(N×N). In case there is no crosstalk, the amount of computation goes down to ½.

The vehicle-mounted three dimensional sound field reproducing unit of this invention does not necessarily coerce the number of the speakers in the left and right to be limited to three. Theoretically, since the control points increase in correspondence with the number of the speakers, the larger the number of the speakers becomes, the more the original sound field is accurately simulated. However, since the amount of signal processing is proportional to the second power of the number of the speakers, the unit having an unreasonably large number of speakers is not practical when the number of the channels and the capacity of computation processing in an ordinary audio device are considered.

When considered from the viewpoint of simulation accuracy, on the other hand, disposing one speaker on the left and right side respectively shows little or no difference from the conventional headphone system. Therefore, the reasonable choice will therefore be at least more than two speakers for each ear. This technique of using two speakers for each ear is, however, insufficient in accuracy because the sound field can only be reproduced along the line connecting the two control points.

In case three speakers are used for each ear, the sound field can be reproduced within the region of a triangle formed by connecting the three control points. In this case, it is possible to reproduce even the travelling direction of the sound waves within the region by reproducing the sound pressure at the control points. In order to perceive the three dimensional (three-dimensional) sound field, it is highly important that the travelling direction of the sound waves is reproduced. Considering the direction of propagation of the sound waves, the number of the speakers with which one expects to reproduce the sound field with high accurate and which does not amount to a large scale for practical use will be three in the left and right respectively, i.e., six in total.

Figure 4:
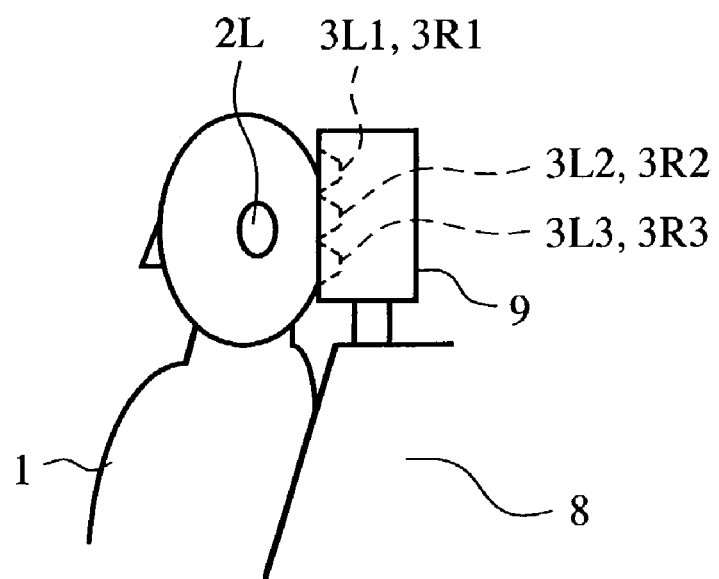
FIG. 4 is an enlarged side view of the headrest.
Figure 3:
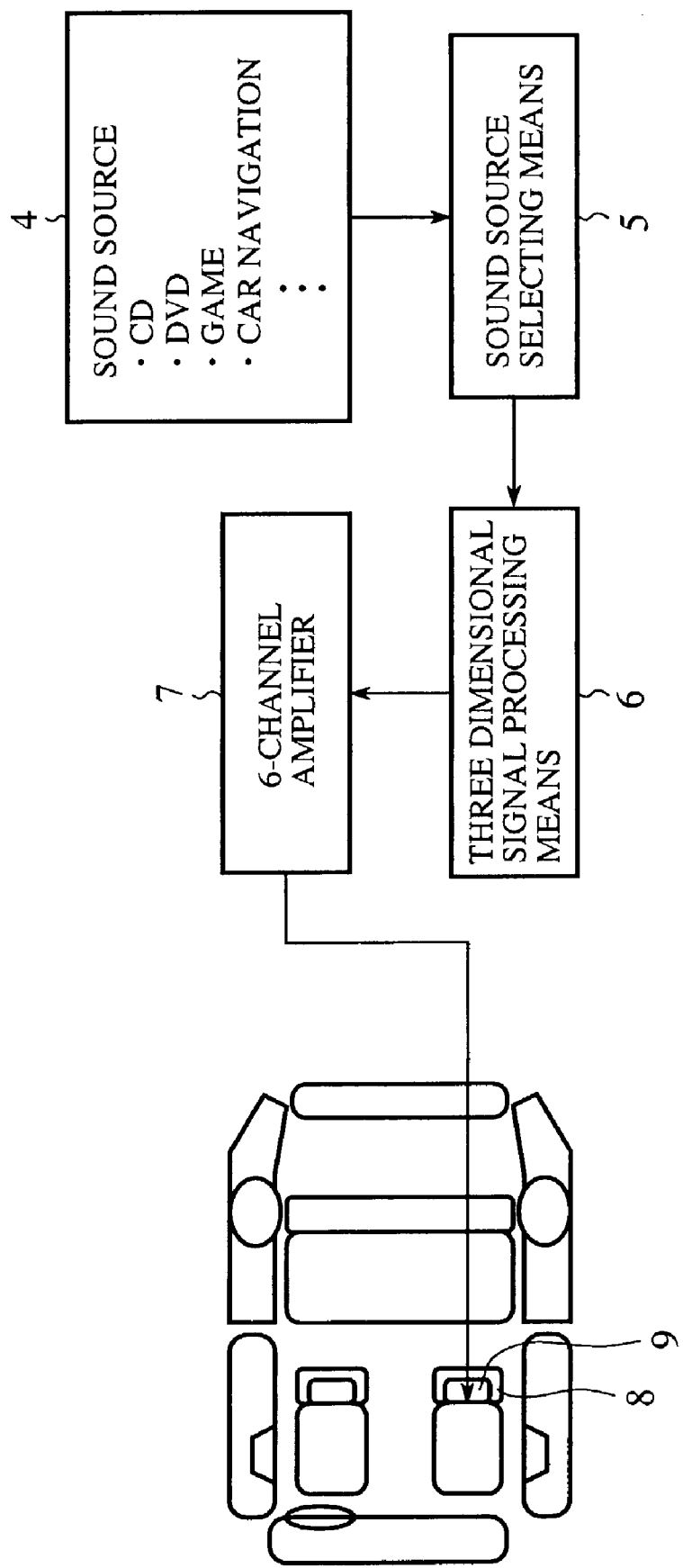
FIG. 3 is a schematic diagram showing the state in which the speakers are disposed in a headrest of a front passenger s seat.
Figure 5:
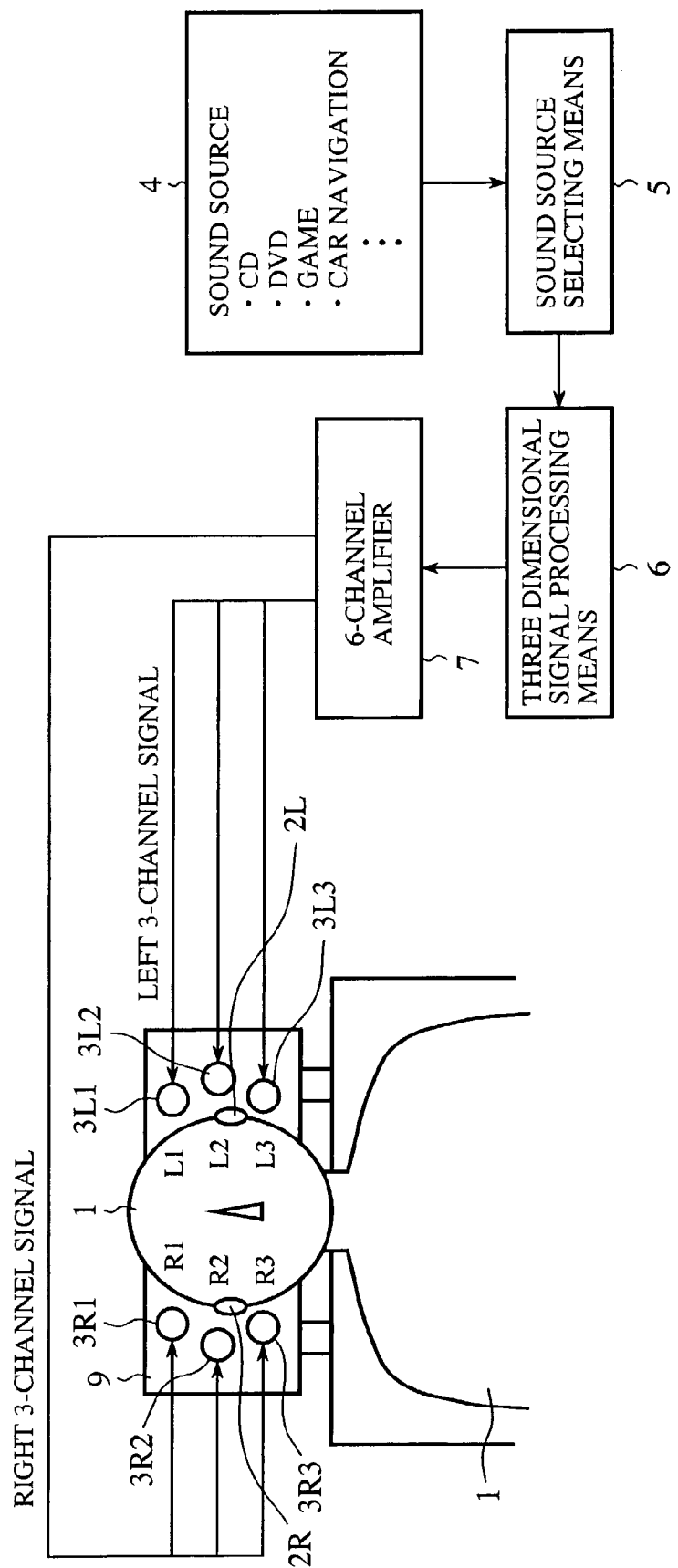
FIG. 5 is a block diagram of a circuit for supplying a reproducing signal to the speakers.

FIG. 3 is a schematic diagram in which a vehicle-mounted three dimensional sound field reproducing unit is disposed in a front passenger s seat in an ordinary vehicle. FIG. 4 is an enlarged side view of a headrest of the front passenger s seat. FIG. 5 is a front view thereof, in which speakers 3L1, 3L2, 3L3 and 3R1, 3R2, 3R3 are disposed in a headrest 9 projecting from an upper surface of a backrest 8 of the seat.

In FIGS. 3 and 4, the signal outputted from the sound source 4 is selected by the sound source selecting means 5 and subjected to signal processing by the three dimensional signal processing means 6 depending on the sound source 4, thereby outputting analog signals equal to the number of the speakers (FIG. 4 is an example of 6 channels).

The signal outputted from the three dimensional signal processing means 6 is amplified by the 6-channel amplifier 7 to a level required for listening and are inputted to each of the six speakers 3L1, 3L2, 3L3 and 3R1, 3R2, 3R3 which are built in the headrest 9. The speakers 3L1, 3L2, 3L3 and 3R1, 3R2, 3R3 are respectively disposed by distributing them in the left and right with the head of the listener 1 sandwiched therebetween. The speakers 3L1, 3L2, 3L3 reproduce the sound field near the left ear of the listener 1 and the speakers 3R1, 3R2, 3R3 reproduce the sound field near the right ear.

As described above, according to the first embodiment, the speakers 3L1, 3L2, 3L3 and 3R1, 3R2, 3R3 are disposed in the headrest 9 on the backrest 8 that is present closest to the head 1 and the external ears of the listener 1. Therefore, the head 1 of the listener is positioned between the left and right speakers 3L1, 3L2, 3L3 and 3R1, 3R2, 3R3, thereby shortening the distance to the control points. As a result, an ideal audible region is generated between the left and right speakers, which reduces crosstalk.

Second Embodiment

FIGS. 7(a) and 7(b) are diagrams showing an embodiment in which an attempt is made to reduce crosstalk between the left and right speakers and in which a pair of left and right recessed portions 9L, 9R are formed in a front of the headrest 9 so that the speakers 3L1, 3L2, 3L3 and 3R1, 3R2, 3R3 are buried deep into the head rest 9 in a position sequestered from the surface of the recessed portions 9L, 9R.

Figure 8:
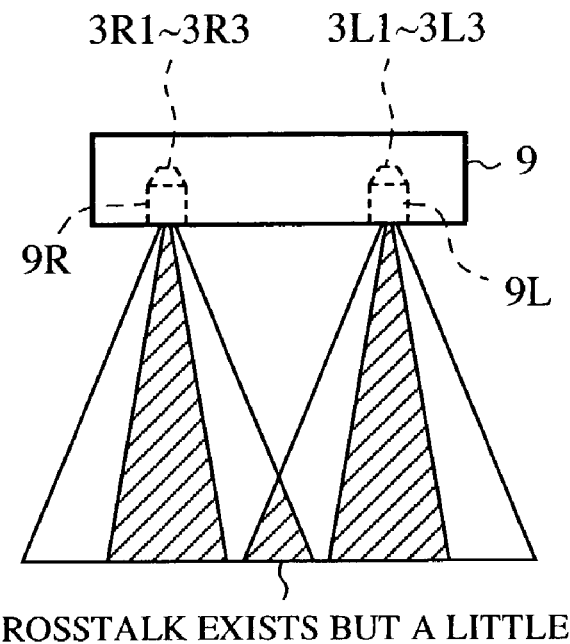
FIG. 8 is a distribution diagram of sounds radiated from the speakers.

Having been arranged as above, in case the speakers are disposed on the face of the headrest 8, the distribution of sounds radiated from the speakers extends as shown in FIG. 6, thus generating a region in which a large quantity of crosstalk occurs. On the other hand, if the speakers are buried deep into the headrest 9 as with the second embodiment, the distribution of sounds radiated from the speakers will be as shown in FIG. 8, whereby the region in which a large amount of crosstalk occurs can be made smaller than the arrangement shown in FIG. 6.

As described above, according to the second embodiment, the occurrence of crosstalk in the left and right speakers can surely be reduced.

Third Embodiment

Figure 9:
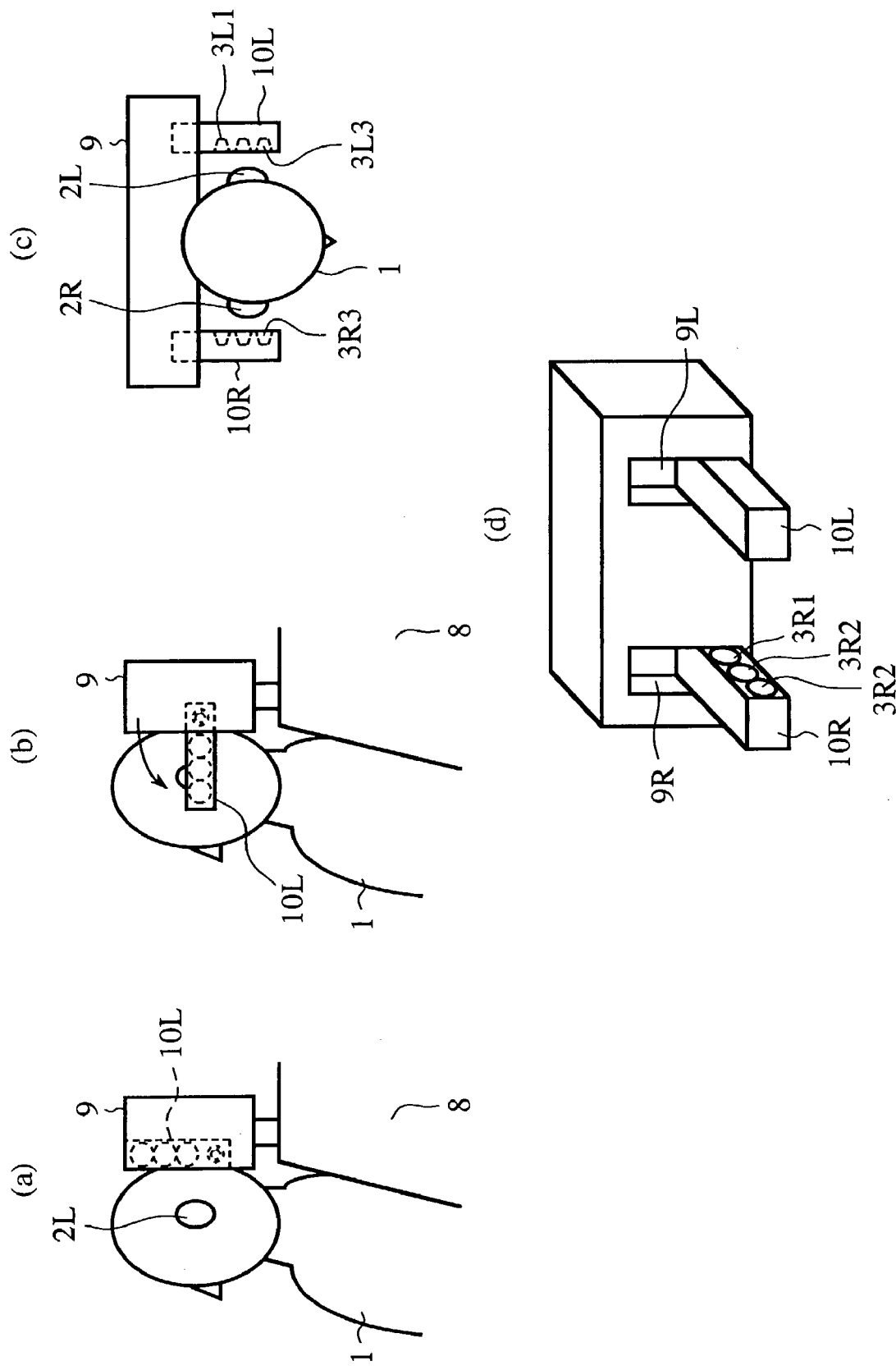
FIGS. 9($a$) through 9($d$) are diagrams showing the layout of another speakers, wherein FIG. 9($a$) is a schematic drawing not in use, FIG. 9($b$) is a diagram in use, FIG. 9($c$) is a plan view in use, and FIG. 9($d$) is a perspective view in use.

FIGS. 9(a) through 9(d) are diagrams showing an arrangement according to the third embodiment, wherein FIG. 9(a) is a side view, FIG. 9(b) is a side view in a state in which the speakers are in use, FIG. 9(c) is a plan view of FIG. 9(b), and FIG. 9(d) is a perspective view of FIG. 9(b). As shown in FIGS. 9(a) through 9(d), the speakers 3L1, 3L2, 3L3 and 3R1, 3R2, 3R3 are housed inside the headrest 9 so that they can be pulled out for use when necessary. The left and right speakers 3L1, 3L2, 3L3 and 3R1, 3R2, 3R3 are respectively housed in a small boxes 10L, 10R, and these boxes 10L, 10R are retractably housed into recessed portions 9L, 9R in the headrest 9 so that, when not in use, the boxes 10L, 10R are housed into the recessed portions 9L, 9R and, when in use, the boxes 10L, 10R are pulled out of the recessed portions 9L, 9R in the headrest 9.

As described above, according to the third embodiment, by housing the speakers 3L1, 3L2, 3L3 and 3R1, 3R2, 3R3 inside the boxes 10L, 10R which are retractably arranged into, and pulled out of, the recessed portions 9L, 9R in the headrest 9, the speakers can be disposed in positions closer to the external ears. As a result, this offers an advantage that a listening state is obtained which is akin to a state where an ideal headphone is worn by the listener, and that the boxes 10L, 10R does not interfere by housing them into the recessed portions 9L, 9R when not in use.

Fourth Embodiment

Figure 10:
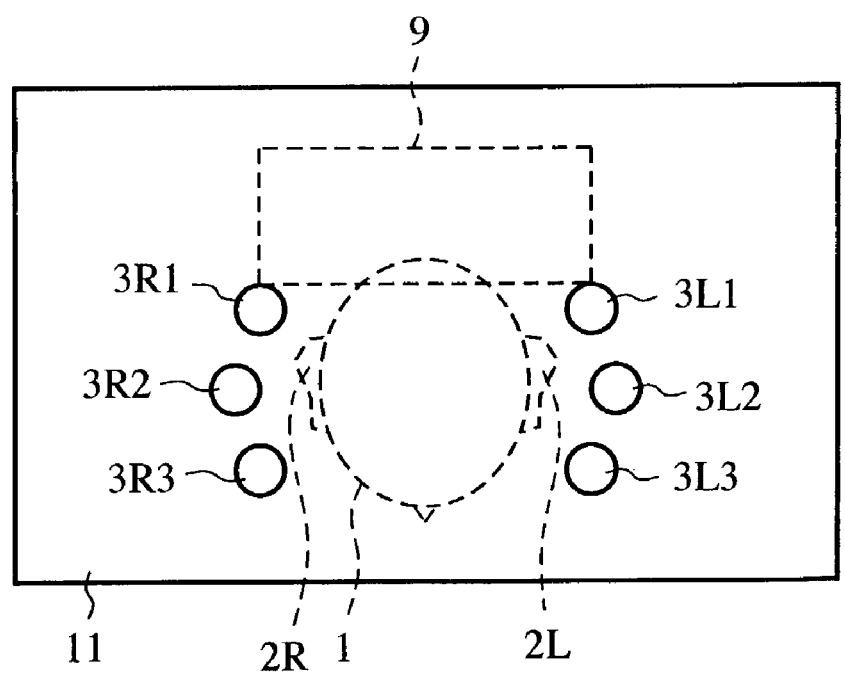
FIG. 10 is a plan view in which the speakers are disposed on a ceiling so as to surround a head of a seated listener in correspondence with left and right external ears of the listener.
Figure 11:
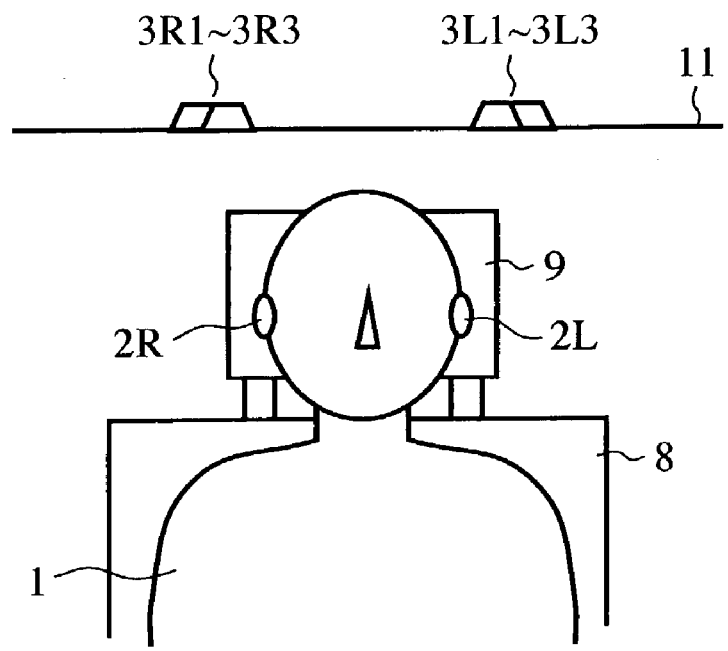
FIG. 11 is a front view of the seated listener.

FIG. 10 is a plan view showing an embodiment in which the speakers 3L1, 3L2, 3L3 and 3R1, 3R2, 3R3 are buried into a ceiling surface 11 of a vehicle, and FIG. 11 is a front view thereof. The speakers 3L1, 3L2, 3L3 and 3R1, 3R2, 3R3 are disposed on the ceiling surface 11 of the vehicle so as to surround the head 1.

As described above, according to the fourth embodiment, the distance from the ceiling surface 11 of the vehicle to the head 1 of the listener is small, and a more freedom in the disposition of the speakers can be won than the headrest 9.

Fifth Embodiment

Only disposing the speakers 3L1, 3L2, 3L3 and 3R1, 3R2, 3R3 on the ceiling surface 11 of the vehicle as shown in FIGS. 10 and 11 fails to get rid of a danger that crosstalk level of the left and right speakers 3L1, 3L2, 3L3 and 3R1, 3R2, 3R3 would become high. In order to solve this problem, in the fifth embodiment, there is provided a partition plate 12, as shown in the perspective view of FIG. 12 and in the front view of FIG. 13, between the speakers 3L1, 3L2, 3L3 and 3R1, 3R2, 3R3 disposed in the left and right so as to sandwich the head 1.

Figure 12:
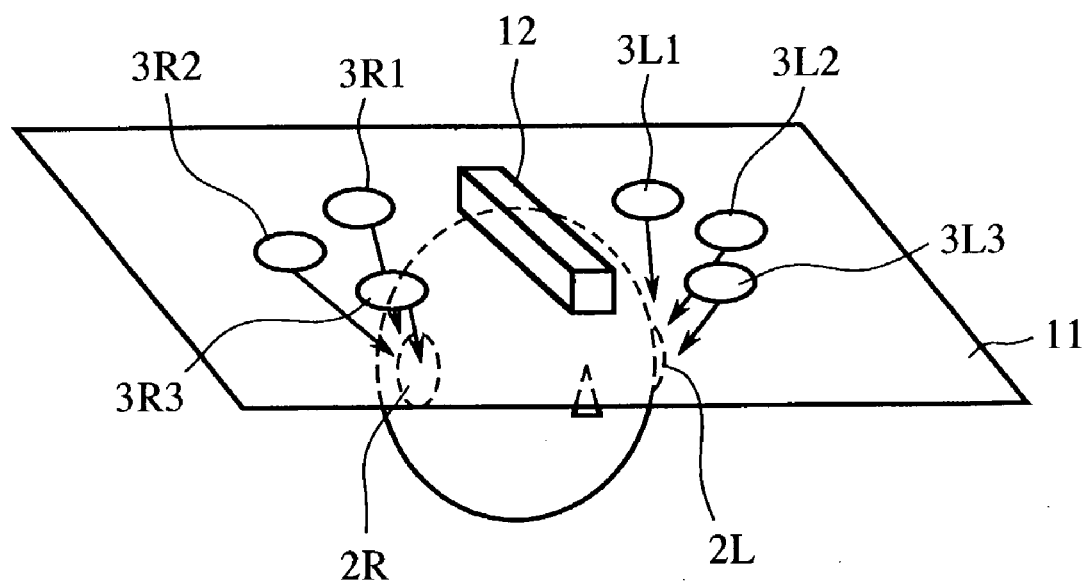
FIG. 12 is a perspective view in which a partition plate is disposed between the left and right speakers.
Figure 13:
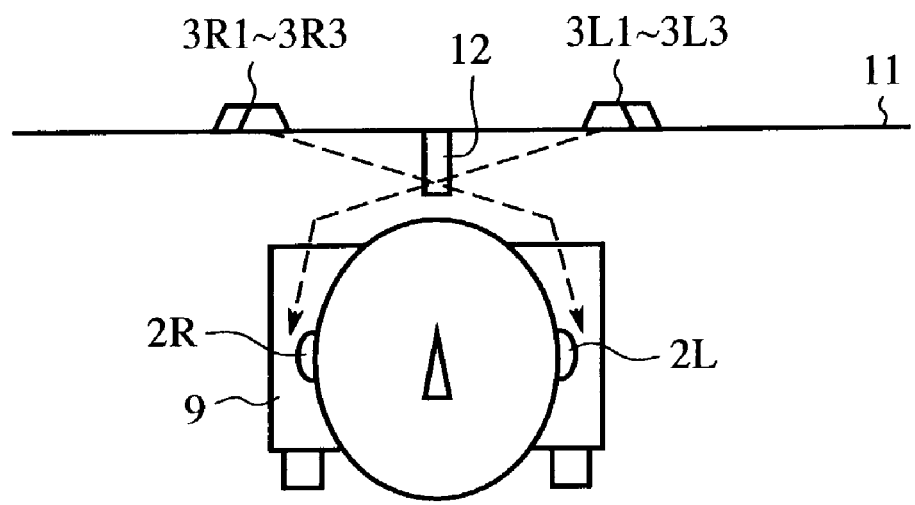
FIG. 13 is a front view.

As described above, according to the fifth embodiment, it is possible to realize the reduction in crosstalk between the left and right speakers 3L1, 3L2, 3L3 and 3R1, 3R2, 3R3 as shown in FIGS. 12 and 13.

Sixth Embodiment

Figure 14:
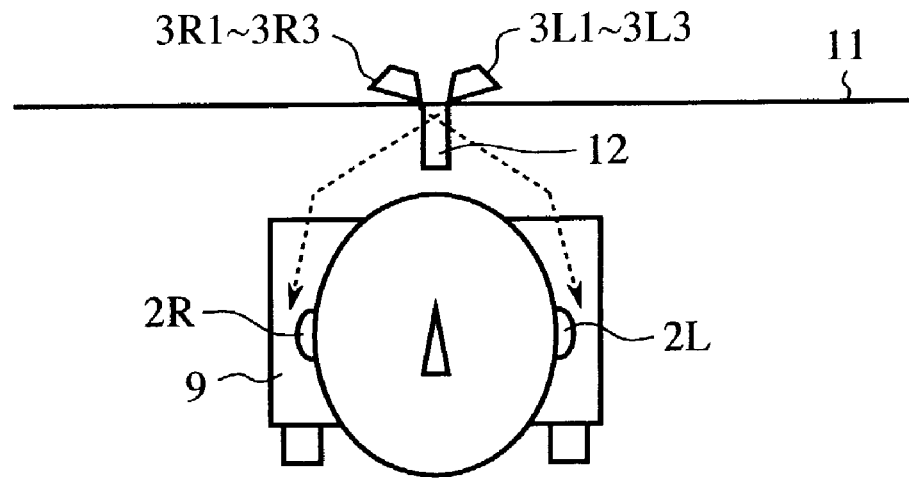
FIG. 14 is a front view in which the left and right speakers are disposed near the partition plate.

FIG. 14 is a schematic diagram showing an arrangement for further reducing crosstalk. The left and right speakers 3L1, 3L2, 3L3 and 3R1, 3R2, 3R3 are disposed close to the partition plate 12 so that the direction of the sounds radiated from each of the speakers is directed to the respective ears.

As described above, according to the sixth embodiment, the level indicative of the direct sounds radiated from the right speakers 3R1, 3R2, 3R3 come into the left ear and the level indicative of the direct sounds radiated from the left speakers 3L1, 3L2, 3L3 come into the right ear are respectively decreased. A further reduction in crosstalk thus becomes possible.

Seventh Embodiment

Figure 15:
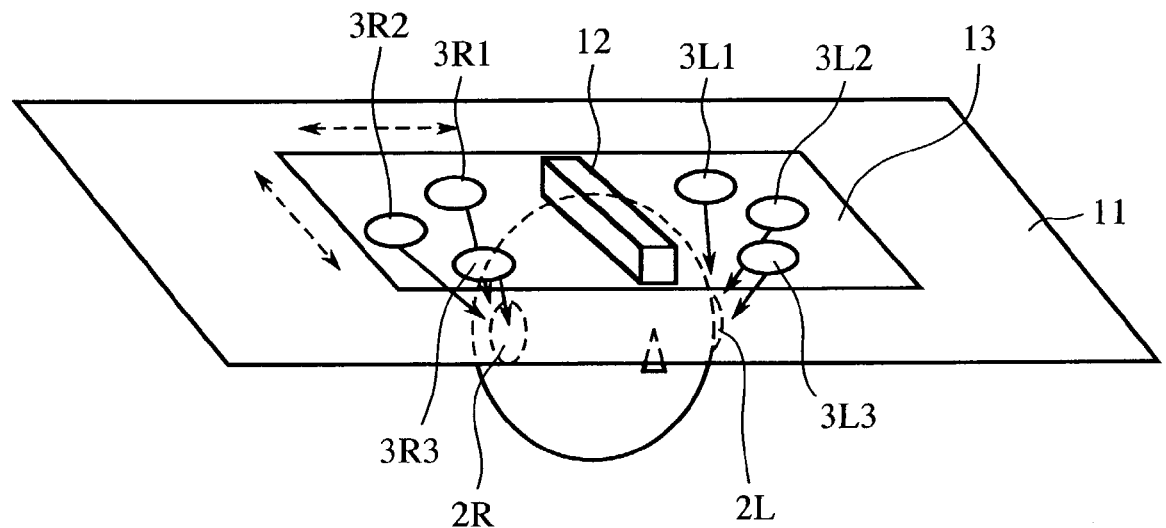
FIG. 15 is a perspective view in which a board having integrated therewith the speakers and the partition plate is disposed on the ceiling so as to be movable left and right and back and forth.

FIG. 15 is a perspective view in which the speakers 3L1, 3L2, 3L3 and 3R1, 3R2, 3R3 and the partition plate 12 are integrally mounted on a board 13 in the shape of a single piece of plate, and are disposed on the ceiling 11 of the vehicle so as to be movable back and forth and left and right by means of a rail structure (not shown).

As described above, according to the seventh embodiment, even if there happed to move the seat in the back and forth direction or the head of the listener 1, the speakers 3L1, 3L2, 3L3 and 3R1, 3R2, 3R3 and the partition plate 12 can be disposed in a most appropriate position, which ensures at all times an ideal sound effect.

Eight Embodiment

Figure 16:
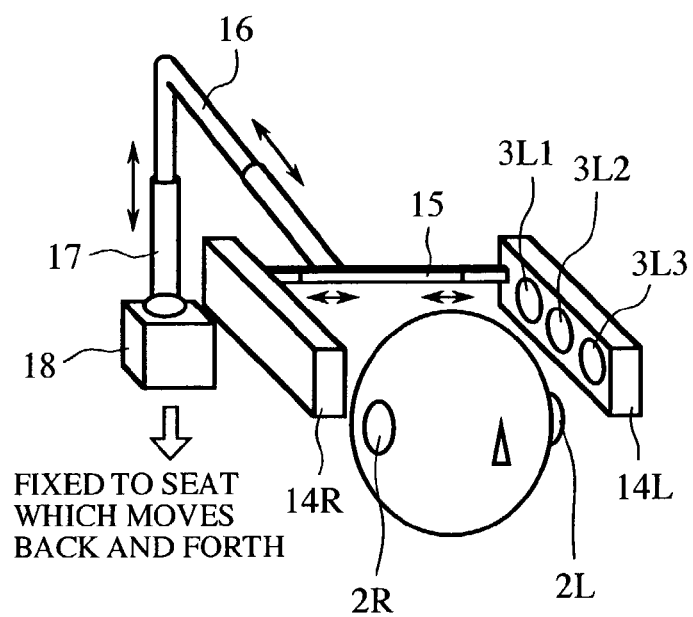
FIG. 16 is a perspective view showing an arrangement of supporting the speakers with poles.

FIG. 16 is a perspective view in which, in case a seat itself such as a front seat of a vehicle is movable in the back and forth direction, wherein the module is made up of pole parts 15 through 17 which adjustably support speaker mounting parts 14L, 14R provided in the left and right of the head of the listener 1 and which have sliding structure and are flexibly connected to one another; and a base 18 which supports a base end of the pole 17. The base 18 for supporting the base end of the pole 17 is of a structure to allow the pole part 17 to incline in an arbitrary direction.

As described above, according to the eight embodiment, even if there happed to move the seat in the back and forth direction, it is possible to maintain the positional relationship between the speaker mounting parts 14L, 14R and the head of the listener 1. In addition, the pole 15 has a sliding structure in a portion to which the left and right speaker mounting parts 14L, 14R are connected together. This permits an adjustment of the distance between the left and right speaker mounting parts in correspondence with the size of the head of the listener 1. The poles 16, 17 have sliding structures in the back and forth direction and in the vertical direction, respectively. This enables a fine adjustment of the positional relationship between the speaker mounting parts 14L, 14R and the head.

Ninth Embodiment

Figure 17:
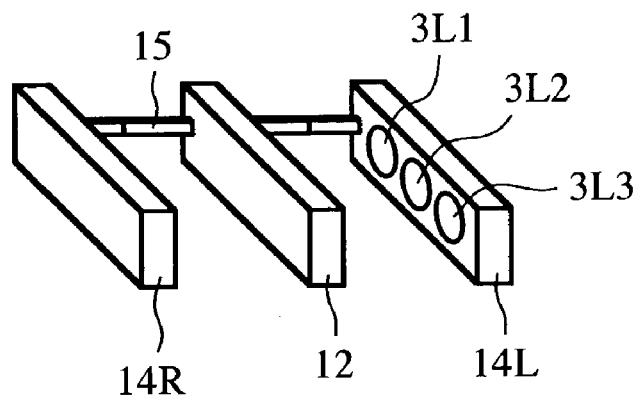
FIG. 17 is a perspective view in which the partition plate for reducing crosstalk is provided between the speakers.

FIG. 17 a perspective view in which the partition plate 12 for reducing crosstalk between the left and right speakers is rotatably provided in an intermediate of the pole 15 which supports the left and right speaker supporting parts 14L, 14R.

As described above, according to the ninth embodiment, it efficiently reduces crosstalk by the partition plate 12 and, when not necessary, the partition plate 12 can be rotated in a non-interfering rearward position.

Tenth Embodiment

Figure 18:
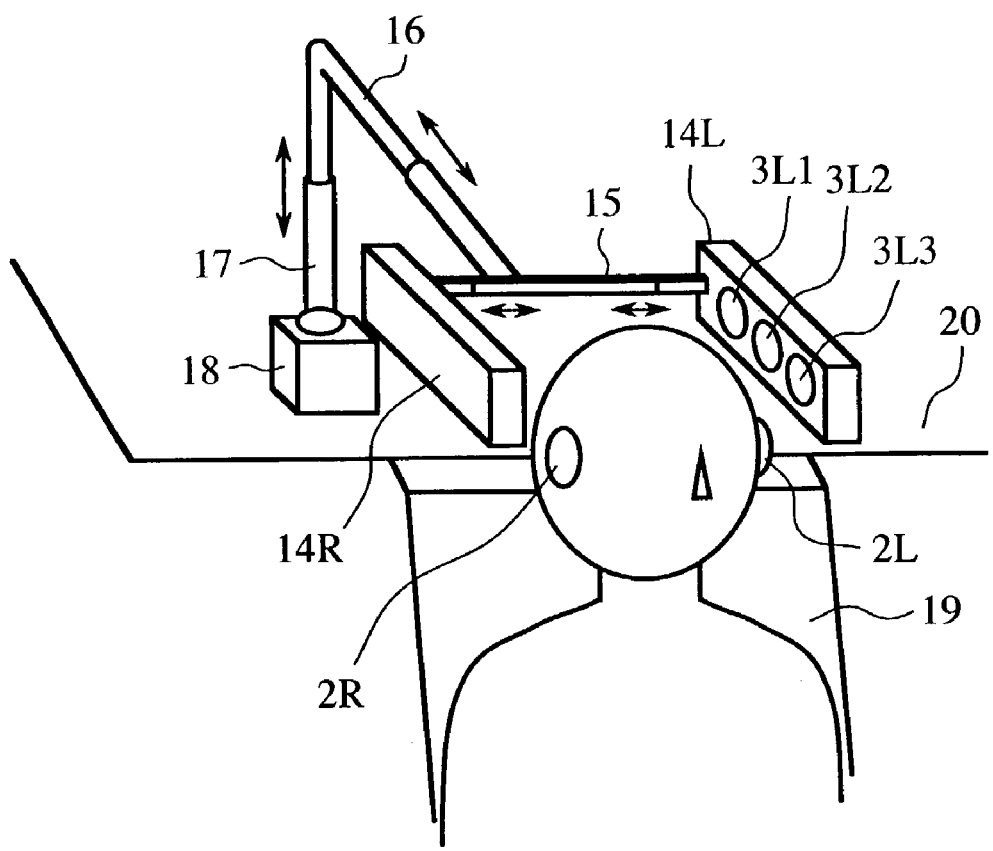
FIG. 18 is a perspective view showing a state in which the speakers are mounted on a roof of a rear seat.

FIG. 18 a perspective view in which, in case a seat such as a rear seat 19 does not move in the back and forth direction, the base 18 of a sliding structure as shown in FIG. 16 is fixed to a rear tray or to a rear shelf 20 on the rear seat 19.

As described above, according to the tenth embodiment, even in case the seat 19 does not move in the back and forth direction, the sliding structure of the poles 15 through 17 allows a fine adjustment of the positional relationship between the speaker mounting parts 14L, 14R and the head.

Eleventh Embodiment

Figure 19:
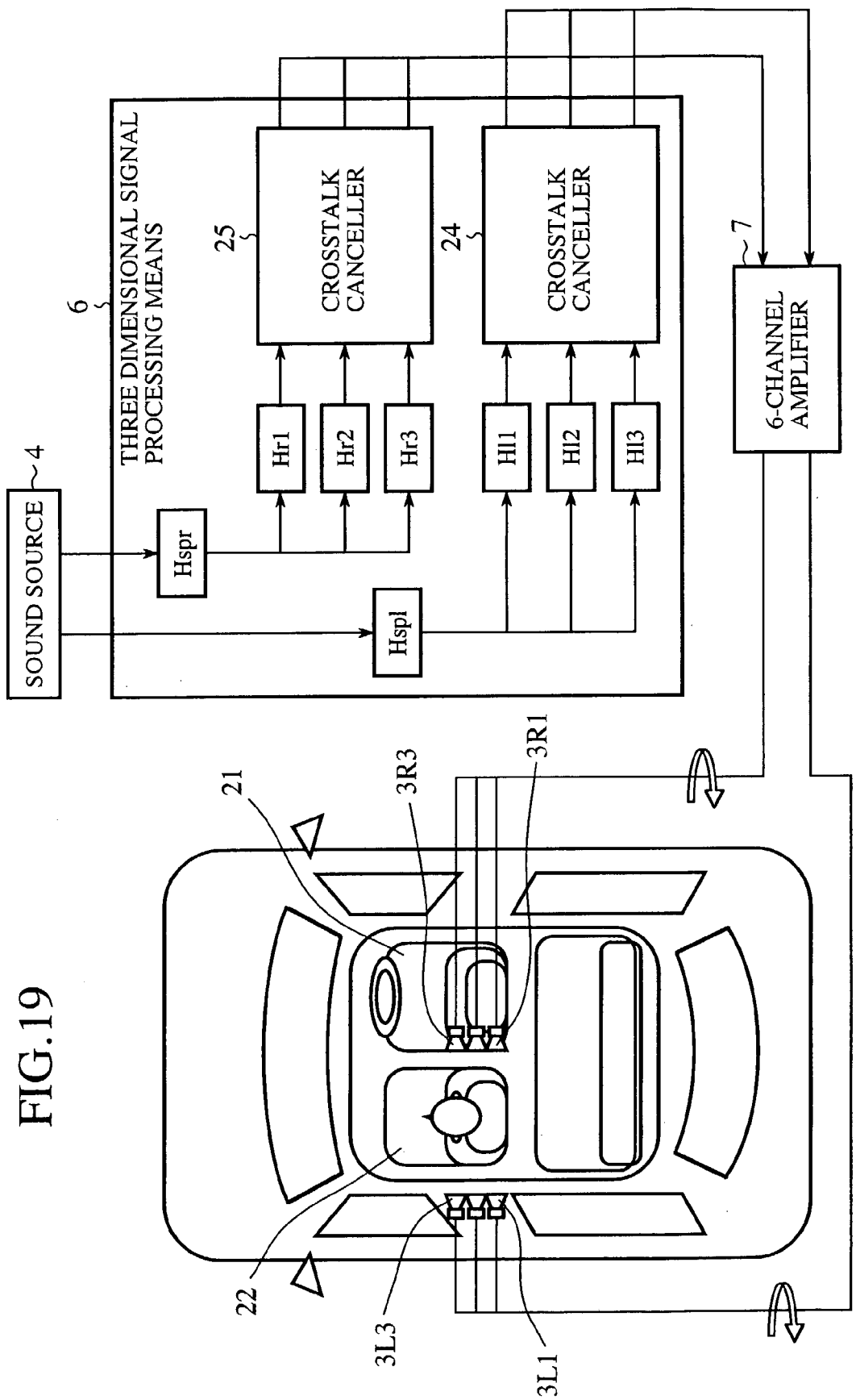
FIG. 19 is a plan view in which the speakers are mounted on a center pillar and a side face of an adjoining seat.
Figure 20:
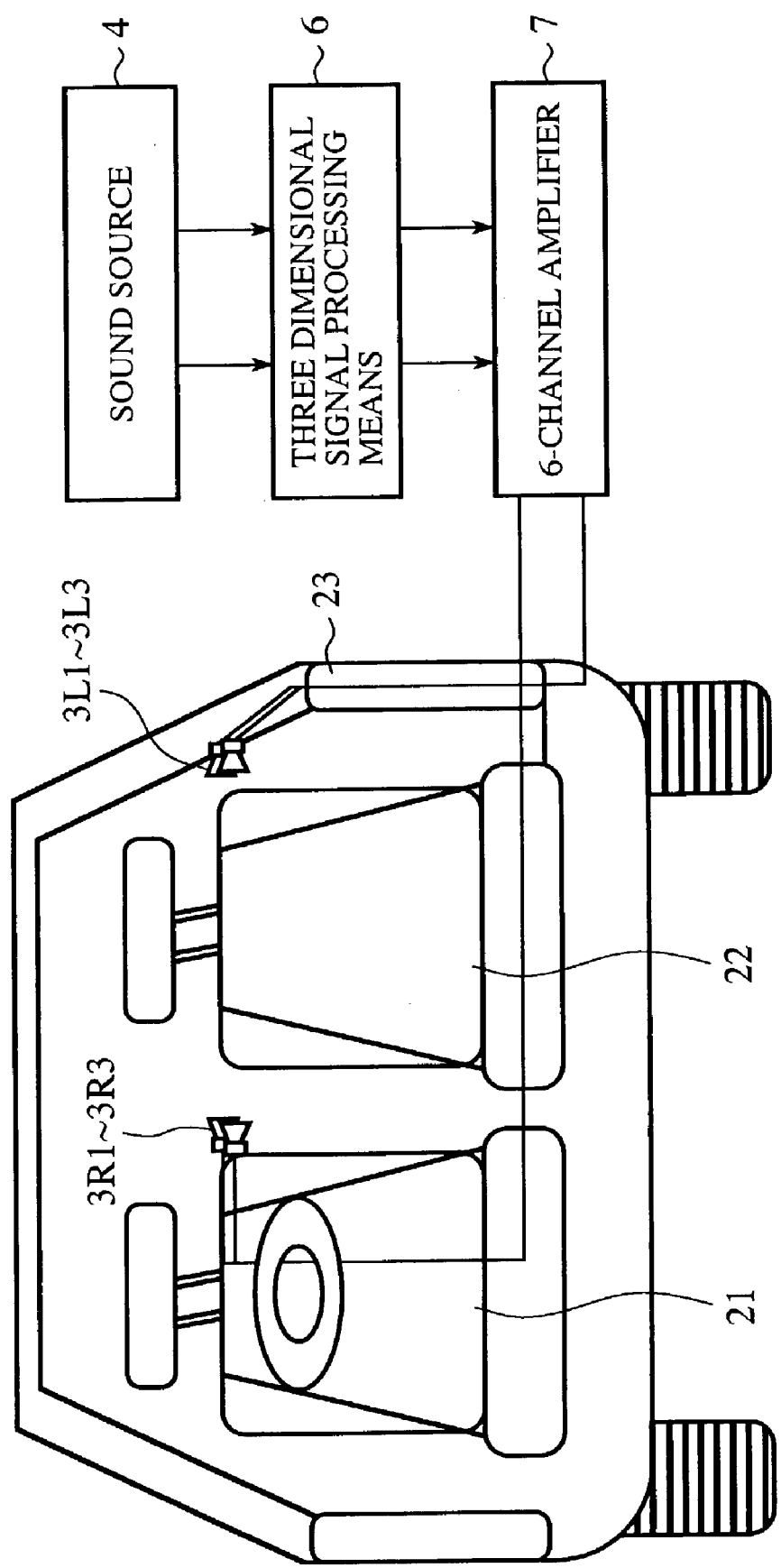
FIG. 20 is a front view.

FIG. 19 is a plan view showing the eleventh embodiment in which speakers 3L1, 3L2, 3L3 are disposed on a pillar which is positioned substantially in the center in front and in rear inside a vehicle compartment, and speakers 3R1, 3R2, 3R3 are disposed on a side of an adjacent seat. FIG. 20 is a front view of the arrangement of the speakers 3L1, 3L2, 3L3 and 3R1, 3R2, 3R3 in FIG. 19 as viewed from the front of the vehicle.

Referring to FIGS. 19 and 20, reference numeral 21 denotes a driver s seat, reference numeral 22 a front passenger s seat, and reference numeral 23 the pillar positioned substantially in the center in front and in rear on the left side of the vehicle compartment. Like reference numerals as FIG. 2 indicated like components and therefore descriptions thereof are omitted for brevity s sake. As the sound source 4, an audio reproducing unit such as a CD player or the like is exemplified. Since the switching of the sound source 4 is not particularly required, the sound source selecting means 5 shown in FIG. 2 is omitted in FIGS. 19 and 20.

The three dimensional signal processing means 6 includes an inverse transfer characteristic Hsp1 for the left-channel speakers; head transfer function H11, H12, H13 from the left-channel speakers to the speakers 3L1, 3L2, 3L3 disposed near the left ear; a crosstalk canceller 24 as a signal processing part for canceling crosstalk between speakers 3L1 and 3L2, between speakers 3L2 and 3L3, and between speakers 3L3 and 3L1; an inverse transfer characteristic Hspr for the right-channel speakers; head transfer function Hr1, Hr2, Hr3 from the right-channel speakers to the speakers 3R1, 3R2, 3R3 disposed near the right ear; a crosstalk canceller 25 as a signal processing part for canceling crosstalk between speakers 3R1 and 3R2, between speakers 3R2 and 3R3, and between speakers 3R3 and 3R1.

The inverse transfer function Hsp1 for a given left-channel speaker is convoluted for the left-channel signal of the audio reproducing unit as the sound source 4 to correct characteristic of the given speaker. The inverse transfer function Hspr for a given right-channel speaker is convoluted for the right-channel signal of the audio reproducing unit to correct characteristic of the given speaker.

Figure 21:
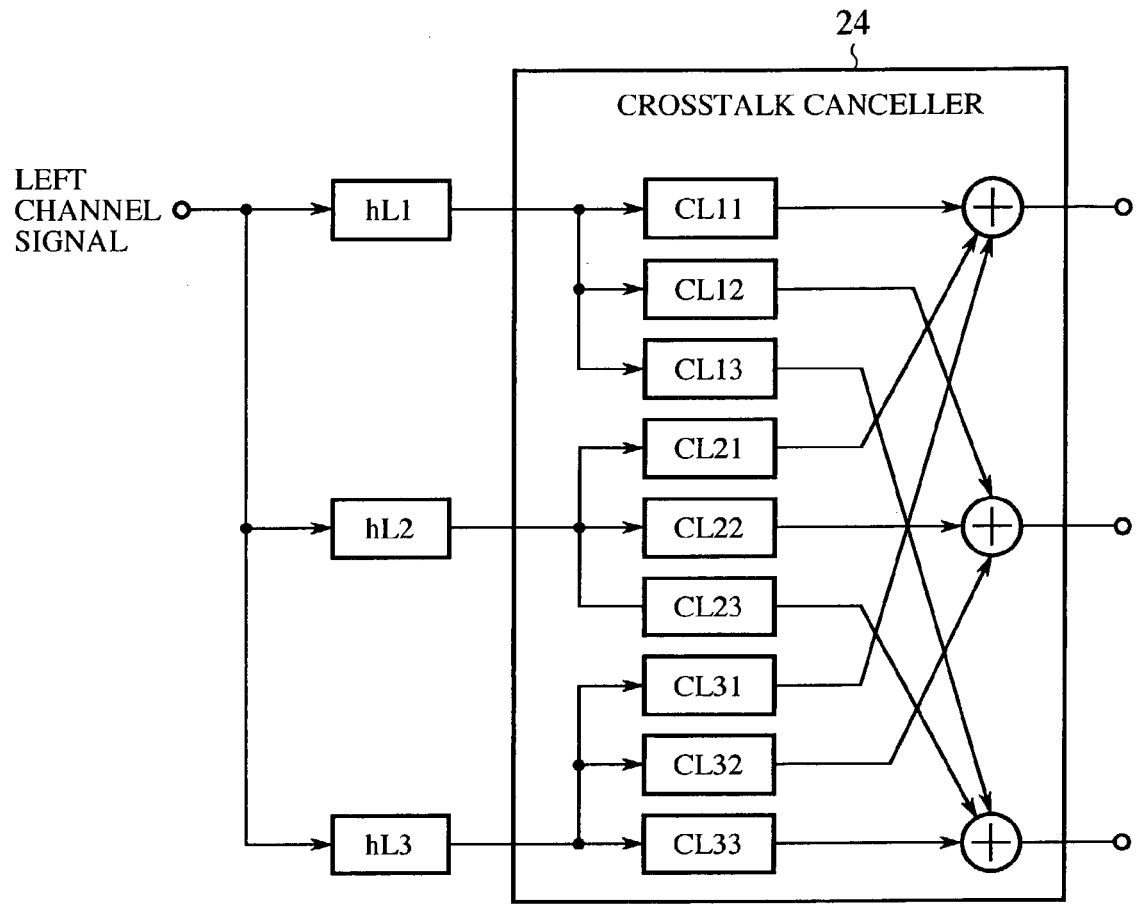
FIG. 21 is a block diagram showing a circuit configuration of a crosstalk canceller.

FIG. 21 is a block diagram showing a circuit configuration of the crosstalk canceller 24 (25).

A description will now be given to the operation of the crosstalk cancellers 24 of the eleventh embodiment.

As a technique for causing a listener to feel as if he/she were listening to the music in a given space, there is a technique in which the sound pressure, phase and particle velocity near the left and right ears are maintained in the same state as in the case of the given space. When the speakers are disposed near both the ears and a reproducing signal which is subjected to a predetermined signal processing is reproduced through the speakers, the sound pressure, phase and particle velocity can be reproduced within the limits of both the ears, without being influenced by the acoustic characteristics in the entire space.

The signal radiated from the speaker 3L1 forms a sound pressure component and a phase component in the space near the left ear. The sound waves radiated from the speaker 3L2 excise an influence upon the speaker 3L1 and disturbs its sound waves. Therefore, the sound pressure component, phase component, and particle velocity in the space near the left ear do not attain a predetermined state.

CL12 in the crosstalk canceller 24 prevents the signal disturbance of the speaker 3L1 by previously adding an inverse characteristic of the component to be disturbed by the speaker 3L2 to the signal of the speaker 3L2. The disturbance between the speakers 3L1 and 3L3 is corrected by crosstalk CL13. The same holds true for the signals of the remaining speakers 3L2, 3L3 in the left channel. Regarding the right-channel signal, a similar signal correction is performed by the crosstalk canceller 25 which has the same configuration as the crosstalk canceller 24.

As described above, according to the eleventh embodiment, since the speakers are mounted on the pillar and the adjacent seat, a larger space can be secured for mounting the speakers and a large back-cavity space can be secured. More freedom can be won for choice of the type of speakers, which secures a reproducing sound pressure response where lower bass is reproducible.

Twelfth Embodiment

Figure 22:
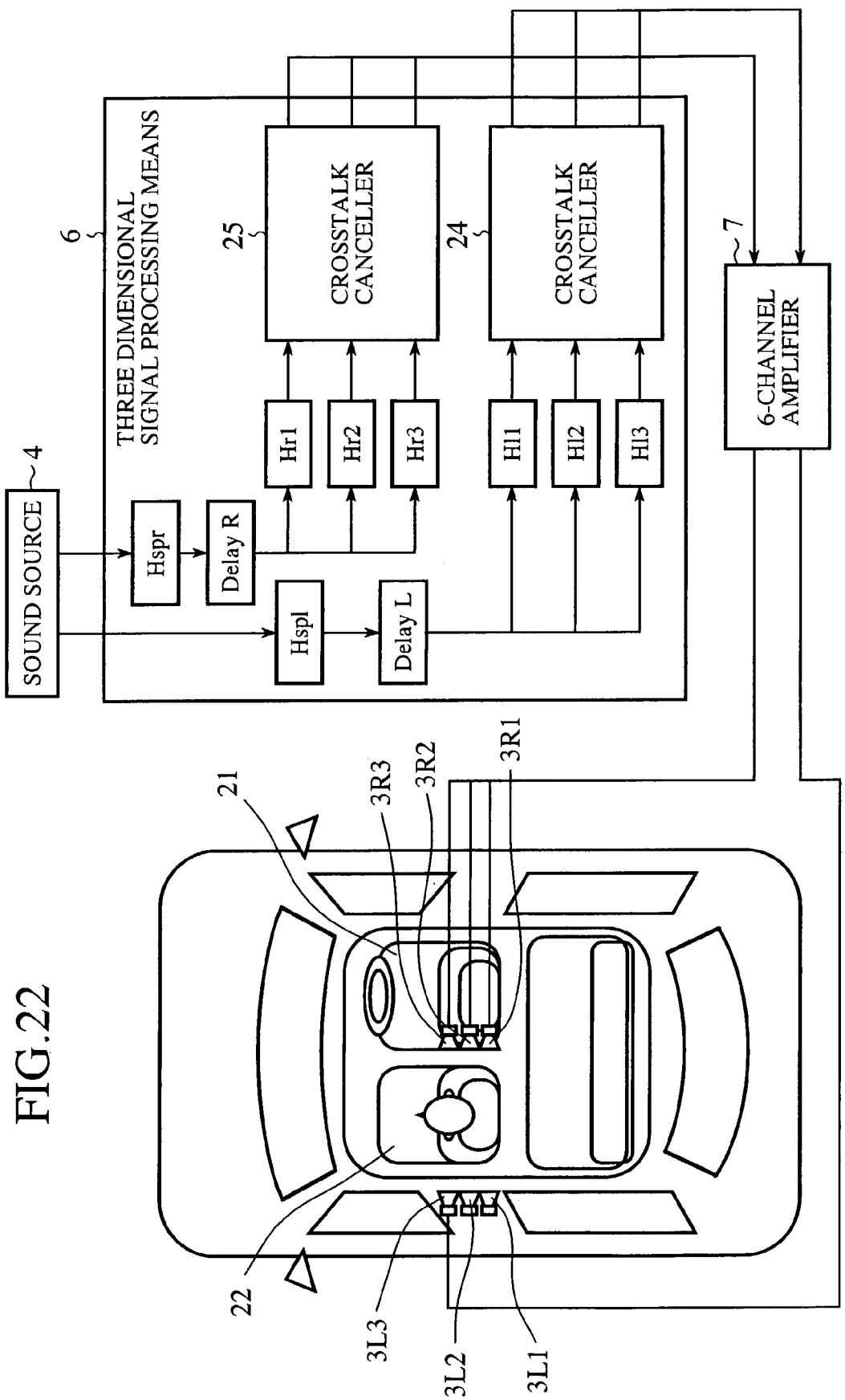
FIG. 22 is a block diagram showing an arrangement including a time delay part.

FIG. 22 is an arrangement for correcting by a delay processing part the time delay due to the difference in distance in a case where the position of a seat is adjusted more forward than FIG. 19, or in a case where the seat is adjusted in the backward or the vertical direction, or the reclining angle of the backrest, whereby the distances from the speakers to the ears of the listener 1 becomes larger. In FIG. 22, reference characters Delay L denote a time delay part for correcting the time delay due to the difference in distance in an array of the left speakers, and reference characters Delay R a time delay part for correcting the time delay due to the difference in distance in an array of the right speakers. The other arrangement is the same as with the tenth embodiment shown in FIG. 19. Therefore, like reference numerals indicate like components and descriptions thereof are omitted for brevity s sake.

According to the above arrangement, when the head of the listener 1 gets out of positions of the left and right speakers 3L1, 3L2, 3L3 and 3R1, 3R2, 3R3, a difference is made in the head transfer function and the crosstalk canceling component. The influence of time delay due to geometric difference in distance is, however, corrected by the time delay part.

As described above, according to the twelfth embodiment, the change in distance between the speakers and the external ears can be corrected by the time delay parts Delay L, Delay R, which appropriately cancels the crosstalk.

Thirteenth Embodiment

Figure 23:
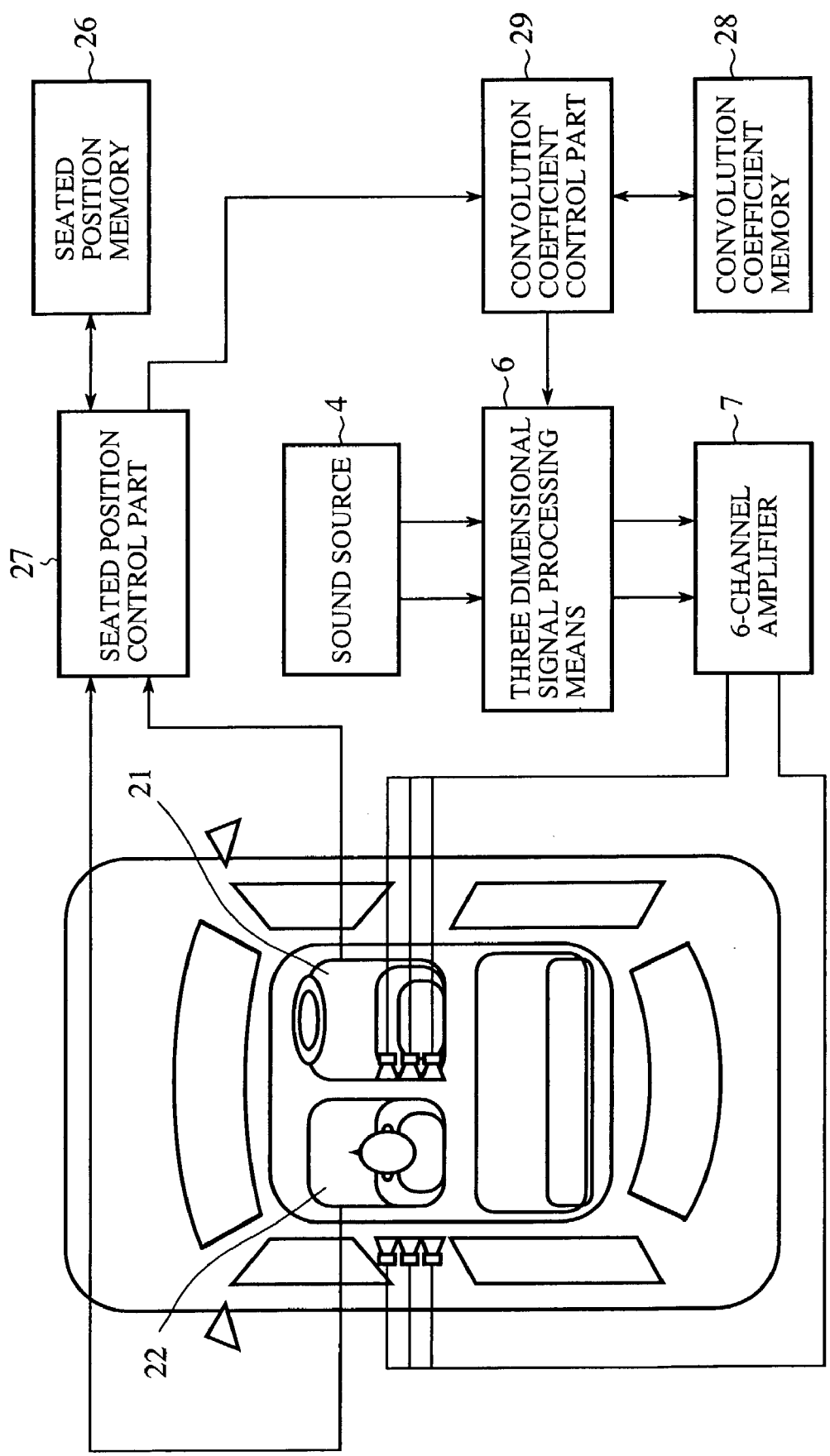
FIG. 23 is a block diagram showing an arrangement in which a seated position is read out from a memory depending on the change in the seated position.

As shown in FIG. 23, the thirteenth embodiment includes a seated position control part 27 which, interlocked with the seated position, reads out the seated position information from a seated position memory 26; and a convolution coefficient control part 29 which reads out a convolution coefficient from a convolution coefficient memory 28 based on the output of the seated position control part 27 to send it to the three dimensional signal processing means 6. The other structure is the same as with the tenth embodiment shown in FIG. 19. Therefore, like reference numerals indicate like components and descriptions thereof are omitted for brevity s sake.

A description will now be given to the operation of the thirteenth embodiment.

The convolution coefficient memory 28 has stored therein, for each of the predetermined positions of the seated seat, a convolution coefficient in which the head transfer function and the crosstalk canceling component have been measured in advance. The coefficient of the position closest to the seated seat is read out to supply it to the three dimensional signal processing means 6. It is thus possible to supply to the speakers the output signal having paid due consideration to the head transfer function and the crosstalk canceling component corresponding to the seated position from the three dimensional signal processing means 6 through the 6-channel amplifier 7.

As described above, according to the thirteenth embodiment, it reduces crosstalk good for the position of the occupied seat.

Fourteenth Embodiment

Figure 24:
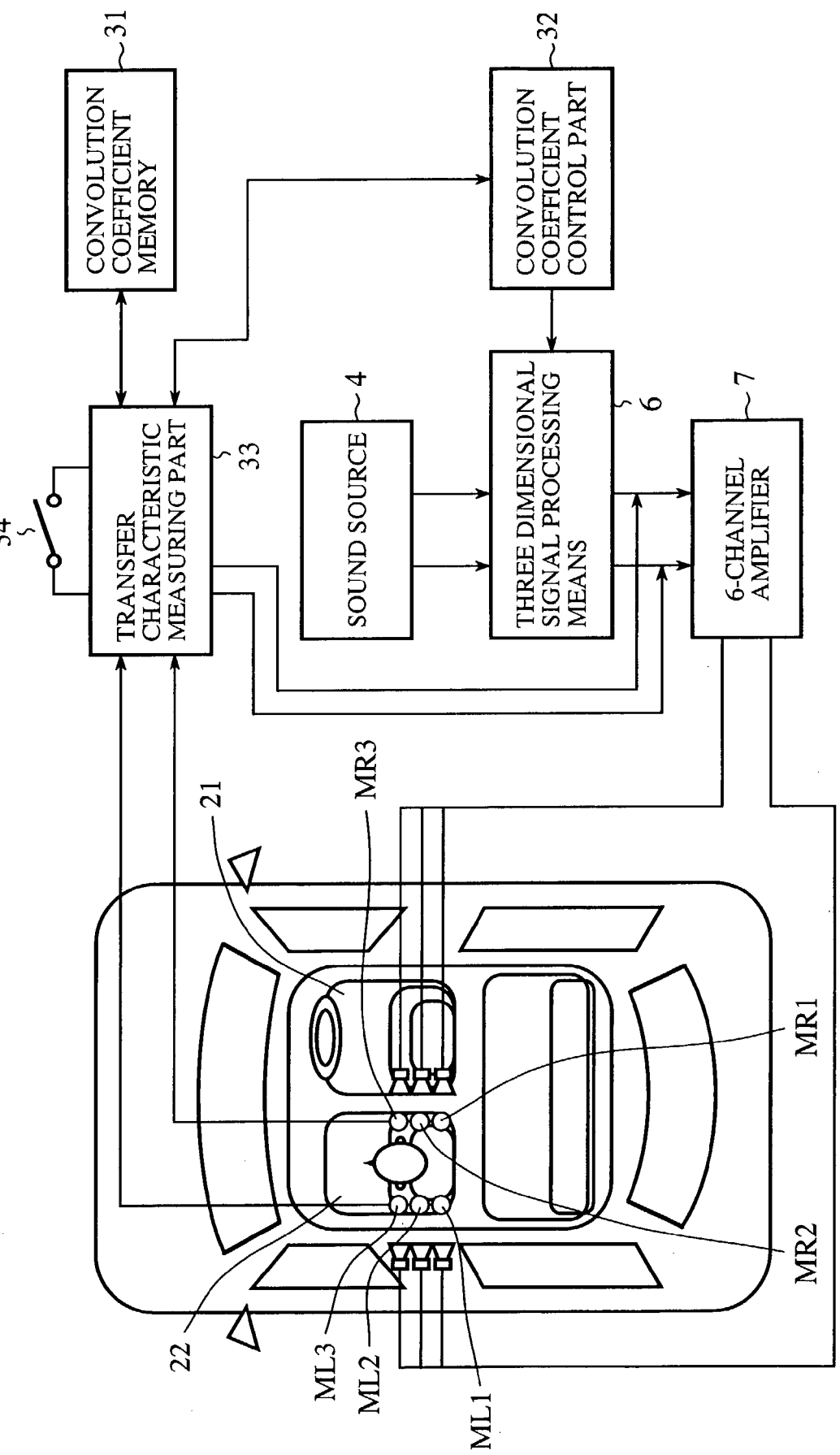
FIG. 24 is a block diagram showing an arrangement including a transfer characteristic measuring part.

FIG. 24 is a block diagram showing the fourteenth embodiment in which the difference in the head transfer function due to the seated seat is measured by microphones ML1 through ML3 and MR1 through MR3 disposed in the headrest, and a convolution coefficient is obtained for storing it. A transfer characteristic measuring part 33 is provided which reads out a convolution coefficient from the convolution coefficient memory 31 depending on the seated position and supplies it to the convolution coefficient control part 32. The other arrangement is the same as with the eleventh embodiment shown in FIG. 19. Therefore, like reference numerals indicate like components and descriptions thereof are omitted for brevity s sake.

Figure 25:
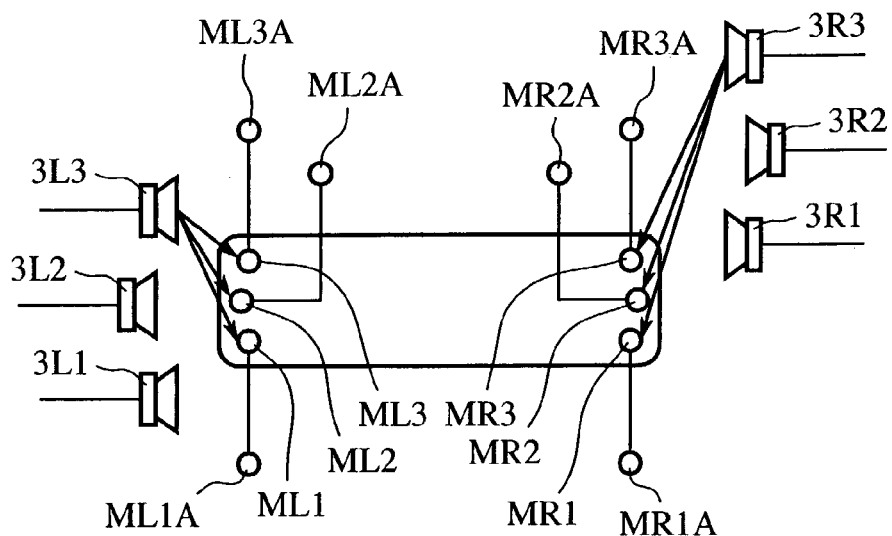
FIG. 25 is an explanatory drawing of a transfer characteristic measurement.

FIG. 25 is an explanatory drawing showing how to find the convolution coefficient. Referring to FIG. 25, reference character ML3 denotes a front microphone mounted on the left side of the headrest, reference character ML1 a rear microphone mounted on the left side of the headrest, and reference character ML2 a microphone positioned between the microphones ML1 and ML3. Similarly, reference characters MR1, MR2, MR3 denote microphones mounted on the right side of the headrest. Reference characters ML1A through ML3A and MR1A through MR3A respectively denote preamplifiers for the microphones ML1 through ML3 and MR1 through MR3. Reference characters 3L1 through 3L3 and 3R1 through 3R3 respectively denote the above-described speakers.

Reference character Gl1-m11 denotes a transfer function between the speaker 3L1 and the microphone ML1, reference character Gl1-m12 a transfer function between the speaker 3L1 and the microphone ML2, reference character Gl1-m13 a transfer function between the speaker 3L1 and the microphone ML3, reference character Gr1-mr1 a transfer function between the right speaker 3R1 and the microphone MR1, reference character Gr1-mr2 a transfer function between the right speaker 3R1 and the microphone MR2, and reference character Gr1-mr3 a transfer function between the right speaker 3R1 and the microphone MR3.

Figure 26:
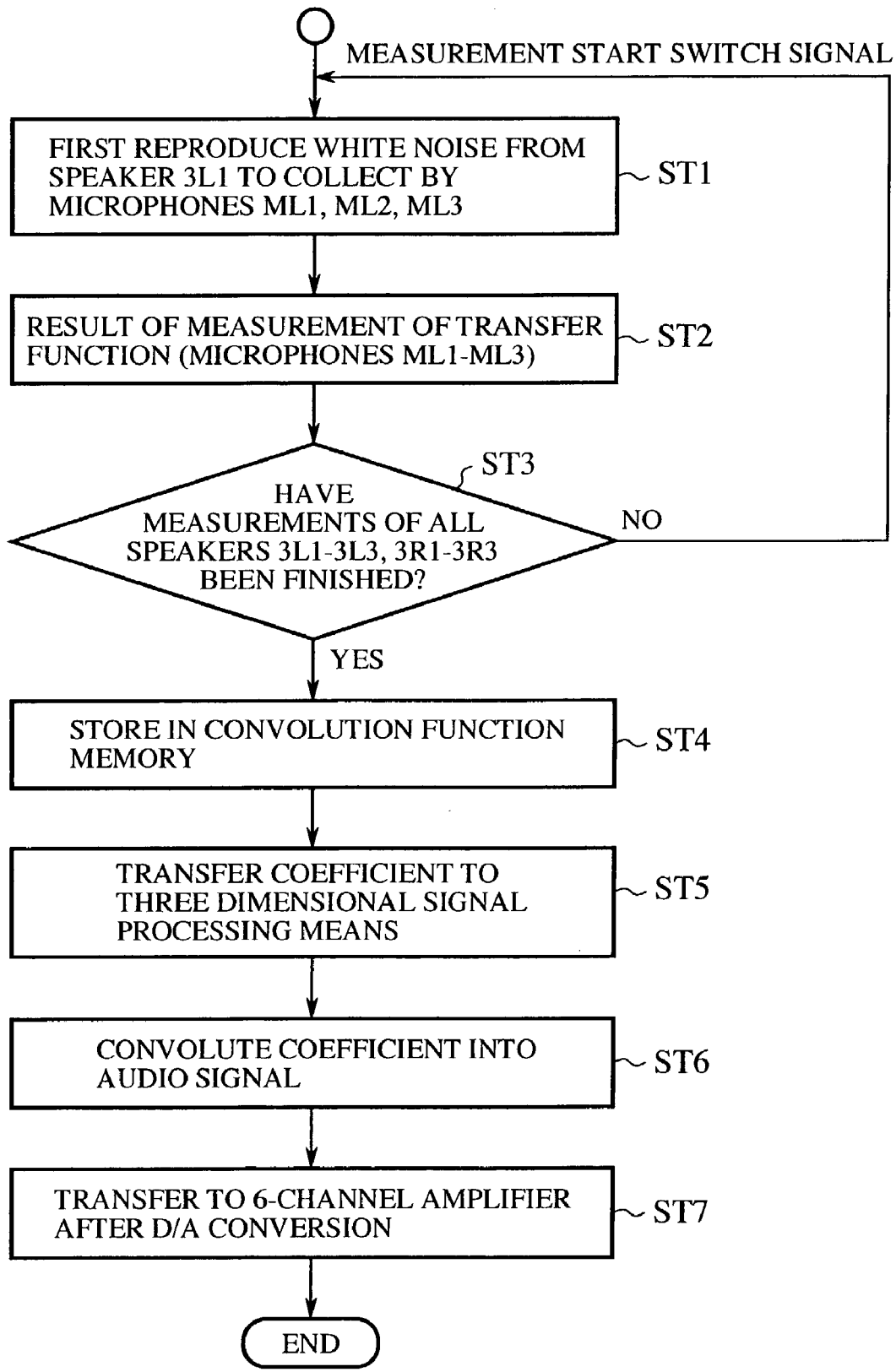
FIG. 26 is a flow chart explaining the operation of transfer characteristic measurement and reproduction.

Then, a description will be given to the measurement of the convolution coefficient with reference to the flow chart in FIG. 26. When a measurement starts, switch 34 is turned on, a white noise signal is generated from the 6-channel amplifier 7 and is radiated from the speaker 3L1. The sound waves of the radiated white noise are collected by the microphones ML1, ML2, ML3, are passed through the preamplifiers ML1A, ML2A, ML3A, and are inputted to the transfer characteristic measuring part 33 (step ST1).

The transfer characteristic measuring part 33 obtains a transfer function from the original white noise signal and the signal collected by the microphone ML1. For example, the white noise and the microphone signal are subjected to discrete Fourier transform, and a transfer function is obtained by the ratio thereof. The inverse transfer function of the transfer function is CL11 in the crosstalk canceller 24 (step ST2).

From the white noise signal and the signal collected by the microphone ML2, CL21 can be obtained, and from the white noise signal and the signal collected by the microphone ML3, CL31 can be obtained. The white noise is reproduced from the speaker 3L2, and CL22 is obtained by the signal collected by the microphone ML1, and CL22 can be obtained by the signal collected by the microphone ML2, and CL32 can be obtained by the signal collected by the microphone ML3. The same holds true for the speaker 3L3. Measurement is similarly made with respect to the right speakers 3R1 through 3R3 (step ST3). The measured inverse transfer function is stored in the convolution function memory 31 as the convolution function (step ST4).

At the time of reproduction, the convolution function is read out from the convolution function memory 31 and is transferred to the three dimensional signal processing means 6 through the convolution function control part 32 (step ST5). The coefficient is convoluted into the audio signal from the sound source 4 (step ST6) and is transferred to the 6-channel amplifier 7 after D/A conversion (step ST7).

As described above, according to the fourteenth embodiment, the difference in the head transfer function produced depending on the position of the seated seat is measured by the microphones ML1 through ML3 and MR1 through MR3 disposed in the headrest 9, and a convolution function is obtained for storing it in the function memory 31. At the time of reproduction, the convolution function is read out from the convolution function memory 31, and is reproduced by transmitting it to the three dimensional signal processing means 6. Therefore, it is possible to generate at all times a three dimensional sound field reproducing space good for the head of the listener.

In the thirteenth and fourteenth embodiments a reference is made to the passenger on the front left seat. Similar effect can also be obtained for the driver seated on the front right seat by disposing the speaker arrays on the right-side pillar and on the side surface of the front left seat inside the vehicle compartment.

In addition, regarding the speakers disposed on the ceiling shown in FIG. 11, similar effect can also be obtained.

INDUSTRIAL APPLICABILITY

As described above, the three dimensional sound field reproducing unit according to this invention is qualified for making the listener enjoyed perceiving a three dimensional sound field with rich presence.

The invention claimed is:

1. A three dimensional sound field reproducing unit comprising:
   at least three speakers provided within a headrest on the top of a backrest of a seat respectively for each of left and right external ears of a listener occupying the seat so as to reproduce sound fields that can be reproduced within a region of space defining a triangle by connecting three control points near the external ears, each control point being defined by a position of one of said at least three speakers, the headrest having a front, a back, a top, a bottom, and left and right sides, wherein the speakers are positioned in the front of the headrest in an area of the headrest where the listener's head rests, so as to sandwich a head of the listener; and
   three dimensional signal processing means for converting an output signal from a sound source into a three dimensional sound field signal for supplying it to each of said speakers,
   wherein said speakers are provided in up and down positions near the left and right external ears of the listeners occupying the seat, respectively.

2. A three dimensional sound field reproducing unit comprising:
   at least three speakers provided, respectively for each of left and right external ears of the listener, being arranged in the front-back direction of the car cabin on a ceiling so as to sandwich a head of a listener occupying a seat from the ceiling of the car cabin;
   a three dimensional signal processing means for converting an output signal from a sound source into a three dimensional sound field signal for supplying it to each of said speakers,
   wherein said at least three speakers respectively provided in correspondence with the left and right external ears are integrally assembled into a board, and said board is provided so as to be movable back and forth and left and right in parallel relative to a ceiling.

3. A three dimensional sound field reproducing unit in a vehicle having a front, a back and two sides, forming a vehicle compartment, comprising:
   at least two seats positioned side by side between the two sides of said vehicle in said vehicle compartment, each seat having a front, back and two sides corresponding to the same direction of said front, back and two sides of said vehicle;
   at least three speakers respectively provided in a center pillar located on one of said sides of said vehicle and adjacent to said corresponding side of one of said two seats, and also in a side of the other of said two seats inside said vehicle compartment such that the speakers are directed at a head of a listener occupying a seat directly adjacent to the center pillar so as to reproduce a sound field that can be reproduced within a region of space defining a triangle formed by connecting three control points, each control point being defined by a position of one of said at least three speakers, where the speakers sandwich a head of a listener occupying the seat directly adjacent to said pillar; and
   three dimensional signal processing means for converting an output signal from a sound source into a three dimensional sound field signal for supplying it to each of said speakers.

\* \* \* \* \*